US012233569B1

(12) United States Patent
Scepaniak et al.

(10) Patent No.: US 12,233,569 B1
(45) **Date of Patent: *Feb. 25, 2025**

(54) COPING NAILER

(71) Applicant: Scepaniak IP Holdings, LLC, Waite Park, MN (US)

(72) Inventors: Kurtis D. Scepaniak, Cold Spring, MN (US); Michael S. Marquette, Melrose, MN (US); Travis M. Marquette, Bowlus, MN (US)

(73) Assignee: Scepaniak IP Holdings, LLC, Waite Park, MN (US)

( * ) Notice: Subject to any disclaimer, the term of this patent is extended or adjusted under 35 U.S.C. 154(b) by 71 days.

This patent is subject to a terminal disclaimer.

(21) Appl. No.: 18/190,734

(22) Filed: Mar. 27, 2023

(51) Int. Cl.
*B27F 7/11* (2006.01)
*B27F 7/02* (2006.01)
*E04D 3/40* (2006.01)

(52) U.S. Cl.
CPC ................ *B27F 7/11* (2013.01); *E04D 3/405* (2013.01)

(58) Field of Classification Search
CPC ........................................................ B27F 7/02
See application file for complete search history.

(56) References Cited

U.S. PATENT DOCUMENTS 3,173,593 A 3/1965 Elliott
3,743,158 A 7/1973 Cohn et al.
3,796,365 A 3/1974 Downing
4,036,422 A 7/1977 Harvey
4,084,738 A * 4/1978 Schneider .............. B27F 7/006 227/111
4,225,074 A 9/1980 Jacobson
5,081,815 A 1/1992 Carnell
5,169,048 A 12/1992 Himebaugh
5,197,257 A 3/1993 Nietling
5,205,103 A 4/1993 Burton
5,381,597 A 1/1995 Petrove
5,749,508 A * 5/1998 Clothier .................. B27F 7/006 227/111
6,543,663 B1 4/2003 Davis
6,755,334 B2 * 6/2004 Ballent, Jr. ............. B27F 7/006 227/129
8,185,240 B2 5/2012 Williams et al.
8,453,900 B1 6/2013 Shirk
(Continued)

FOREIGN PATENT DOCUMENTS

WO WO 2006136653 A1 12/2006

*Primary Examiner* — Praachi M Pathak
(74) *Attorney, Agent, or Firm* — Albert W. Watkins

(57) ABSTRACT

A wheeled conveyance straddles and squeezes a parapet or similar vertical wall from both the inside and outside vertical faces. Side wheels may be adjusted to be closer together or farther apart to accommodate the thickness of the wall being straddled. The conveyance traverses the parapet along the top edge, and at least one fastener driver suspended from the carriage faces one or both of the inside and outside vertical faces at some preferably adjustable distance below the top edge of the parapet. While the conveyance traverses the parapet, an actuator selectively and repeatedly actuates the fastener driver(s). Various sensors and controls are provided that permit the speed, fastener spacing, and travel distance to be adjusted. Position awareness and visual, auditory, and radio communications may optionally be employed.

20 Claims, 9 Drawing Sheets

(56) References Cited

U.S. PATENT DOCUMENTS

| | | | |
|---|---|---|---|
| 8,606,399 | B2 | 12/2013 | Williams et al. |
| 8,855,848 | B2 | 10/2014 | Zeng |
| 8,855,849 | B1 | 10/2014 | Ferguson et al. |
| 8,874,300 | B2 | 10/2014 | Allard et al. |
| 8,874,371 | B2 | 10/2014 | Troy et al. |
| 8,880,271 | B2 | 11/2014 | Jeon |
| 8,886,383 | B2 | 11/2014 | Hyde et al. |
| 8,886,385 | B2 | 11/2014 | Takahashi et al. |
| 8,897,917 | B2 | 11/2014 | Tanaka et al. |
| 8,897,947 | B2 | 11/2014 | Nakano et al. |
| 9,353,519 | B2 | 5/2016 | Williams |
| 9,945,128 | B1 | 4/2018 | Baird |
| 10,189,176 | B2 | 6/2019 | Williams |
| 11,613,041 | B1 | 3/2023 | Scepaniak |

* cited by examiner

COPING NAILER

BACKGROUND OF THE INVENTION

1. Field of the Invention

The present invention pertains generally to the commercial building construction industry, and more specifically to the construction and maintenance of a parapet used in the construction of many commercial roofs. In a particular manifestation, the present invention provides an automated apparatus for nailing or otherwise affixing protective coping and other building materials adjacent to the top of a commercial roof parapet.

2. Description of the Related Art

Commercial roofs have flat, or nearly flat top faces. However, in a strong wind a flat surface on the top of the building experiences substantial pressure drop, causing a great deal of stress tending to lift and potentially separate the roofing materials. To prevent this pressure drop and resultant stress on the roof, parapets are placed on the outside edges of commercial roofs. These parapets serve many purposes. In addition to the ability to decrease the pressure drop, they also serve to limit precipitation that lands on the roof from traveling down the facade of the building and thereby reduce staining and degradation of the facade.

While parapets are provided to protect the roof, parapets also require additional top surface protection at the time of installation, known as a coping. A coping is typically a shaped sheet metal guard that runs along the top edge of the parapet. The coping guides water that would otherwise strike the top of the parapet away from the parapet and facade. On the facade side, there is generally a lip that directs the water outward a small amount, to keep the moisture from directly running or dripping on the facade. In a "straight down" rain without wind, the lip will then shed the water directly to the ground. Over the top surface of the parapet, the coping is typically sloped to preferentially drain the water to the roof surface where it can be drained through the standard roof drainage system. To provide even better moisture and leak protection, the coping may include several parts: a hidden nailed or fastened coping; and an exterior coping flashing that snaps onto the hidden coping.

Depending upon the type of roof and preferred installation method, in addition to or sometimes instead of coping there may be other components that require attachment adjacent to the top edge of the wall or parapet. In many commercial roofs, there are fasteners installed at the top edge of the wall, at the lower angle of a wall, and at times at different heights on the wall.

Fasteners in the vicinity of the top outer perimeter of the roof and building are undesirably difficult and dangerous to install. A worker will be working around the outside edge, which puts the worker at risk of a fall. Current installation processes also requires a worker to work at odd angles and install one fastener at a time. This leads to fatigue and boredom, both that increase risk while decreasing job satisfaction.

For some projects and processes, machinery may be provided to improve safety, decrease fatigue, and improve job satisfaction. One such construction process where artisans have developed such machinery is nailing or fastening. Exemplary U.S. and foreign patents and published applications, the teachings which are incorporated herein by reference, include: U.S. Pat. No. 3,173,593 by Elliott, entitled "Automatic self-propelled nailing machine"; U.S. Pat. No. 3,743,158 by Cohn et al, entitled "Roller mounted nailing machine"; U.S. Pat. No. 3,796,365 by Downing, entitled "Nailing gun carriage"; U.S. Pat. No. 4,036,422 by Harvey, entitled "Roofing nail applicator"; U.S. Pat. No. 4,084,738 by Schneider, entitled "Carrier for automatic nailer"; U.S. Pat. No. 4,225,074 by Jacobson, entitled "Carpet tack-strip installing machine"; U.S. Pat. No. 5,081,815 by Carnell, entitled "Mechanized shingle applying apparatus"; U.S. Pat. No. 5,169,048 by Himebaugh, entitled "Shingling apparatus"; U.S. Pat. No. 5,197,257 by Nietling, entitled "Apparatus for applying shingles to a roof"; U.S. Pat. No. 5,205,103 by Burton, entitled "Shingle laying apparatus"; U.S. Pat. No. 5,381,597 by Petrove, entitled "Automatic robot roofer for installation of shingles"; U.S. Pat. No. 5,749,508 by Clothier, entitled "Nailing gun carrier"; U.S. Pat. No. 6,543,663 by Davis, entitled "Automatic fastening scheduler"; U.S. Pat. No. 6,755,334 by Ballent, Jr., entitled "Automatic nail fastening device"; U.S. Pat. No. 8,453,900 by Shirk, entitled "Rolling staple gun"; U.S. Pat. No. 9,945,128 by Baird, entitled "Automatic roof shingle removal and installation system"; and WO 2006/136653 by Turulin, entitled "Method and system for fabricating roof trusses or similar structures".

Other artisans have developed more general purpose automatic building construction machinery. Exemplary U.S. patents, the teachings which are incorporated herein by reference, include: U.S. Pat. No. 8,185,240 by Williams et al, entitled "Automated apparatus for constructing assemblies of building components"; U.S. Pat. No. 8,606,399 by Williams et al, entitled "Automated apparatus for constructing assemblies of building components"; and U.S. Pat. No. 9,353,519 by Williams, entitled "Automated apparatus for constructing assemblies of building components".

In addition, various artisans have developed various sensors and control systems useful for such exemplary purposes as machine vision, object detection, and navigation. Exemplary U.S. patents, the teachings which are incorporated herein by reference, include: U.S. Pat. No. 8,855,848 by Zeng, entitled "Radar, lidar and camera enhanced methods for vehicle dynamics estimation"; U.S. Pat. No. 8,855,849 by Ferguson et al, entitled "Object detection based on known structures of an environment of an autonomous vehicle"; U.S. Pat. No. 8,874,300 by Allard et al, entitled "Systems and methods for obstacle avoidance"; U.S. Pat. No. 8,874,371 by Troy et al, entitled "Beam directed motion control system"; U.S. Pat. No. 8,880,271 by Jeon, entitled "Robot cleaner and method for controlling the same"; U.S. Pat. No. 8,886,383 by Hyde et al, entitled "Automated systems, devices, and methods for transporting and supporting patients"; U.S. Pat. No. 8,886,385 by Takahashi et al, entitled "Autonomous mobile body and control method of same"; U.S. Pat. No. 8,897,917 by Tanaka et al, entitled "Autonomous mobile device"; and U.S. Pat. No. 8,897,947 by Nakano et al, entitled "Autonomous mobile device".

In addition to the foregoing patents, Webster's New Universal Unabridged Dictionary, Second Edition copyright 1983, is incorporated herein by reference in entirety for the definitions of words and terms used herein.

While these aforementioned and other exemplary patents and published applications too numerous to individually list provide illustration of various machinery and techniques, none provide a solution that may be adapted by those skilled in the commercial roofing industry to the aforementioned challenging parapet and roofing applications. As may be apparent then, in spite of the enormous advancements and substantial research and development that has been conducted, there still remains a need for an apparatus that will improve safety, decrease fatigue, and improve job satisfaction for those workers installing coping and other components that require fasteners to be installed at the top edge of the wall, at the lower angle of a wall, and at times at different heights on the wall in the vicinity of the top outer perimeter of the roof and building.

SUMMARY OF THE INVENTION

In a first manifestation, the invention is a coping nailer. The coping nailer has a conveyance configured to straddle a parapet; a supply of plural fasteners; and a fastener driver. The fastener driver is configured when actuated to drive individual ones of the plural fasteners from the supply into the parapet. An actuator is configured to selectively and repeatedly actuate the fastener driver while the conveyance traverses the parapet.

In a second manifestation, the invention is a method of applying fasteners in the vicinity of a parapet. According to the method, the parapet is straddled with a conveyance having opposed parapet side conveyors configured to traverse the parapet along parapet vertical side walls and at least one parapet top conveyor configured to traverse the parapet along a parapet top surface, a fastener driver supported by the conveyance, and a supply of fasteners supported by the conveyance. At least a first one of the opposed parapet side conveyors is pressed in a first direction against an exterior surface of the parapet. At least a second one of the opposed parapet side conveyors is pressed in a second direction opposite to the first direction against an interior surface of the parapet. The at least one parapet top conveyor is pressed in a third direction perpendicular to the first and second directions against a top surface of the parapet. A drive force is applied sufficient to move the opposed parapet side conveyors and the at least one parapet top conveyor relative to the parapet. The fastener driver is actuated to drive individual ones of the fasteners from the supply into the parapet.

In a third manifestation, the invention is a coping nailer. The coping nailer has a conveyance that is configured to straddle and traverse a parapet and that has opposed parapet side wheels configured to traverse the parapet along parapet vertical side walls and at least one parapet top wheel configured to traverse the parapet along a parapet top surface. A nail magazine is supported by the conveyance and contains a plurality of nails. A nail driver is supported by the conveyance and is configured when actuated to drive individual ones of the nails from the nail magazine into the parapet. An actuator is configured to selectively and repeatedly actuate the nail driver while the conveyance traverses the parapet.

OBJECTS OF THE INVENTION

Exemplary embodiments of the present invention solve inadequacies of the prior art by providing a conveyance that straddles and squeezes a parapet or similar vertical wall from both the inside and outside vertical faces. The conveyance traverses the parapet along the top edge, and at least one fastener driver suspended from the carriage faces one or both of the inside and outside vertical faces at some distance below the top edge of the parapet. While the conveyance traverses the parapet, an actuator selectively and repeatedly actuates the fastener driver.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a machine configured to assist with the installation of coping and other components that require fasteners to be installed at the top edge of the wall, at the lower angle of a wall, and at times at different heights on the wall in the vicinity of the top perimeter of a building roof. A second object of the invention is to provide such a machine that will improve safety, decrease fatigue, and improve job satisfaction for installation workers. Another object of the present invention is to provide a semi-autonomous fastening system to improve safety, efficiency, and accuracy. A further object of the invention is to provide a semi-autonomous fastening system that will hold many fasteners, and will drive along a wall while periodically installing one or a plurality of the fasteners at predetermined distance intervals. Yet another object of the present invention is for some embodiments of the semi-autonomous fastening system to have multiple nailing, drill, or other fastener installation heads. An additional object of the invention is for the semi-autonomous fastening system to adjust to the thickness of a wall when initially clamped thereto. A further object of the invention is for a semi-autonomous fastening machine to stop once a set distance is covered, when the machine runs out of fasteners, when the machine is done drilling or otherwise installing fasteners, when the machine comes to a corner or step up or down on a wall, or when the machine comes up to an obstacle.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred and alternative embodiments, the present invention is designed to speed up the application of a coping layer on a roof parapet while decreasing risk to the person installing the layer, and increasing the reliability of the finished coping layer. The preferred embodiment roof coping nailer does this with the use of motorized wheels, and at least one fastener installer such as a nailer or screw driver which is cyclically brought into contact with the coping edge strip while moving across the parapet. To facilitate the nailing, a person positions the coping edge strip in place, then positions the coping nailer in place, and advances the nailer along the positioned coping edge strip. The end result is a fast and safely nailed coping edge strip along the parapet which does not require scaffolding, or moving ladders, or a person to hang over the edge of the roof with a nailer to position and secure the coping edge strip.

Figure 1:
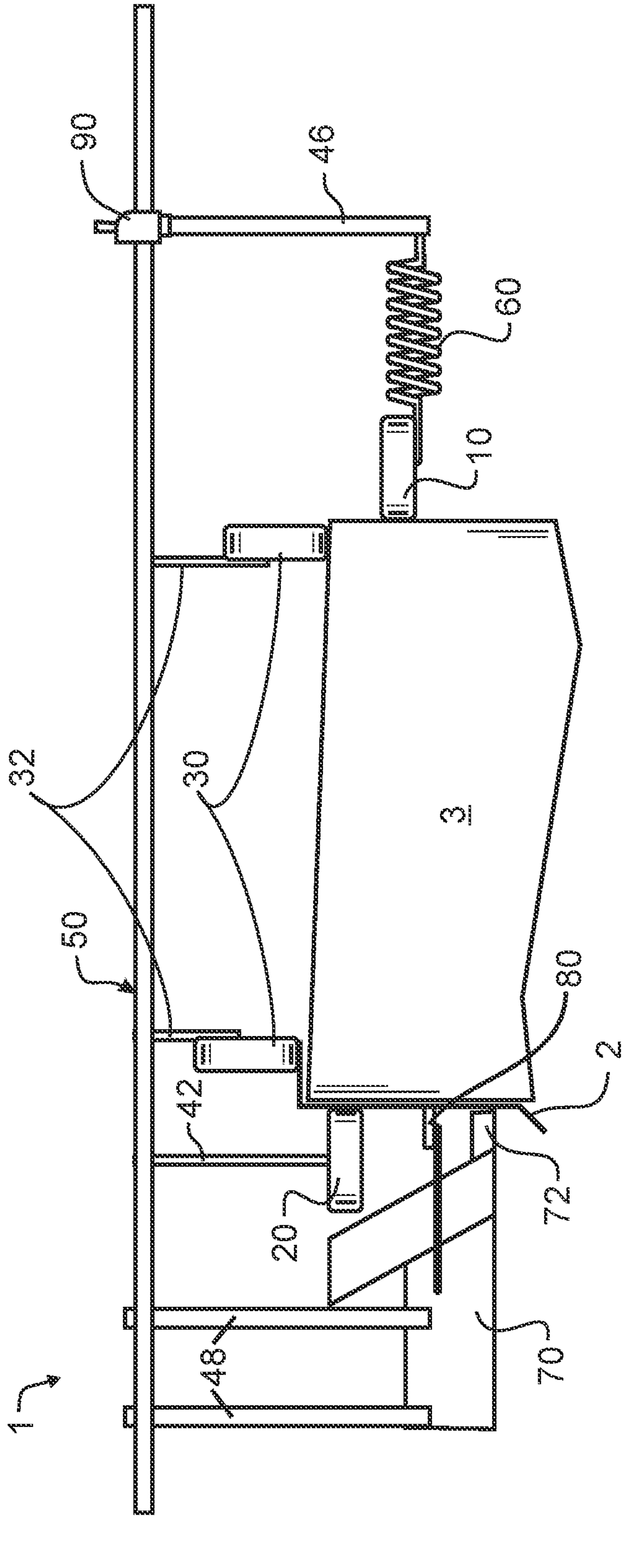
FIGS. 1 and 2 illustrate a first preferred embodiment coping nailer designed in accord with the teachings of the present invention in combination with a parapet and coping edge strip from side elevation and top plan views, respectively.
Figure 2:
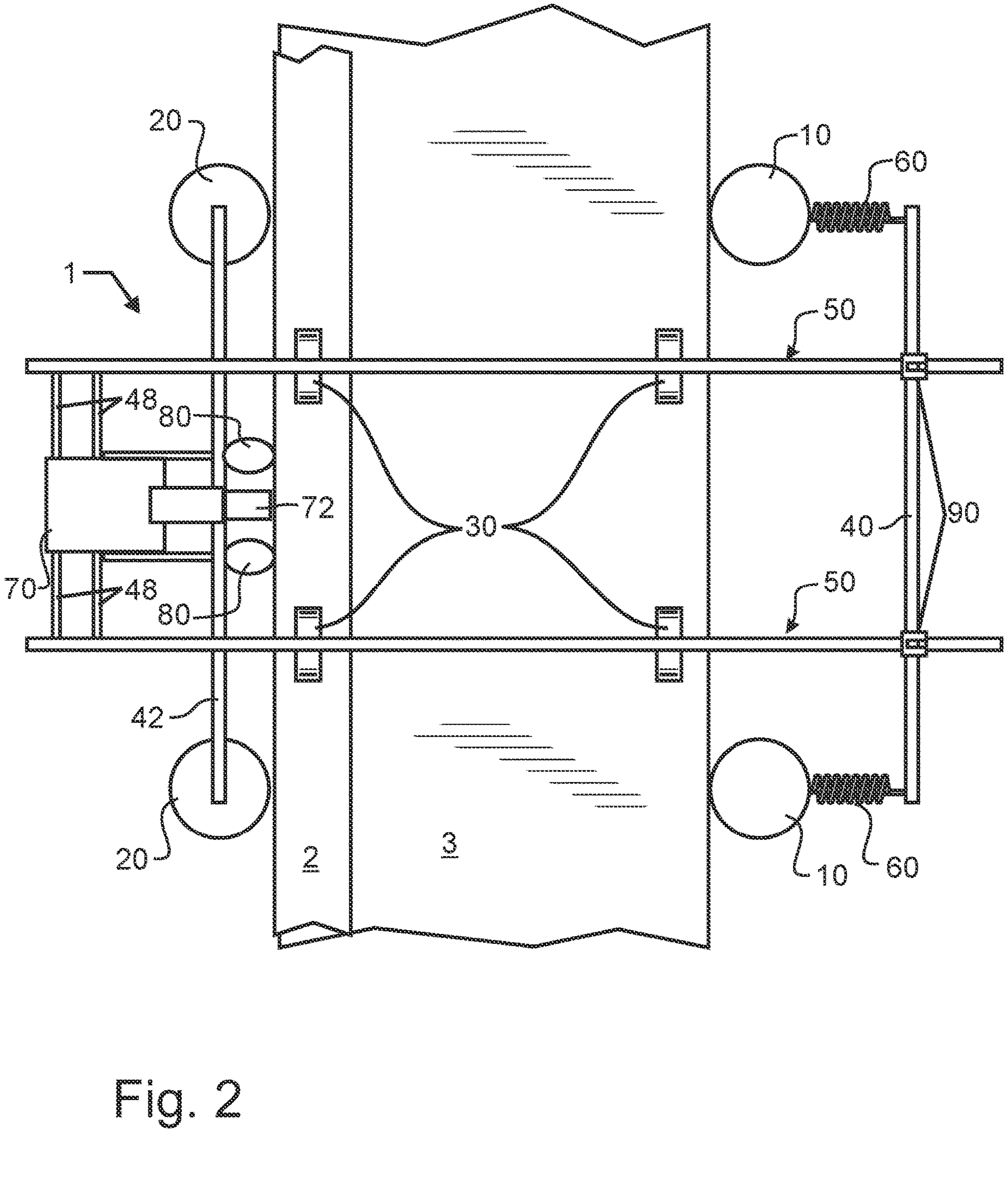
Figure 3:
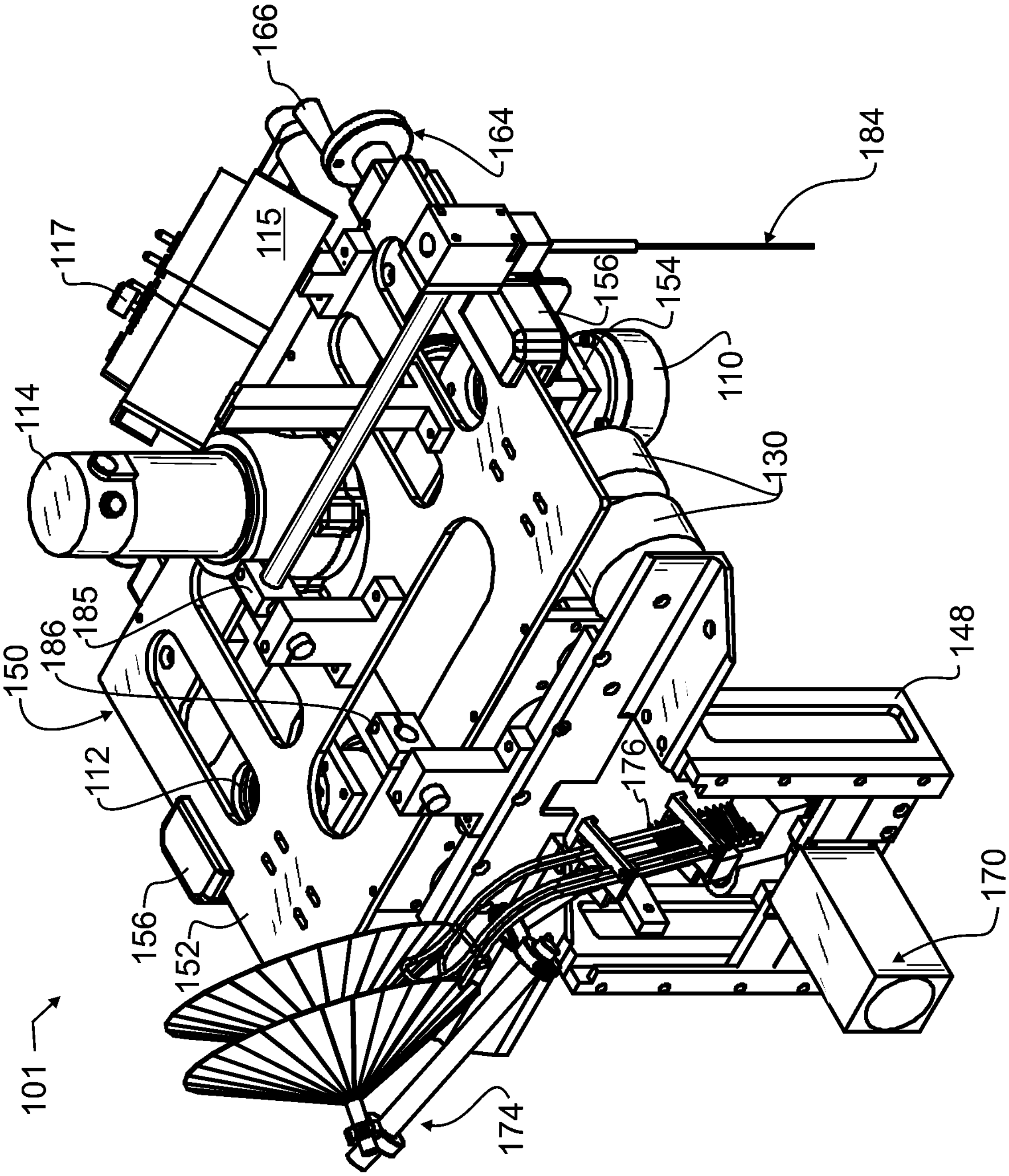
FIGS. 3-6 illustrate a second preferred embodiment coping nailer designed in accord with the teachings of the present invention from a rear and top projected view, a bottom view, a left side elevational view, and a front elevational view, respectively.
Figure 4:
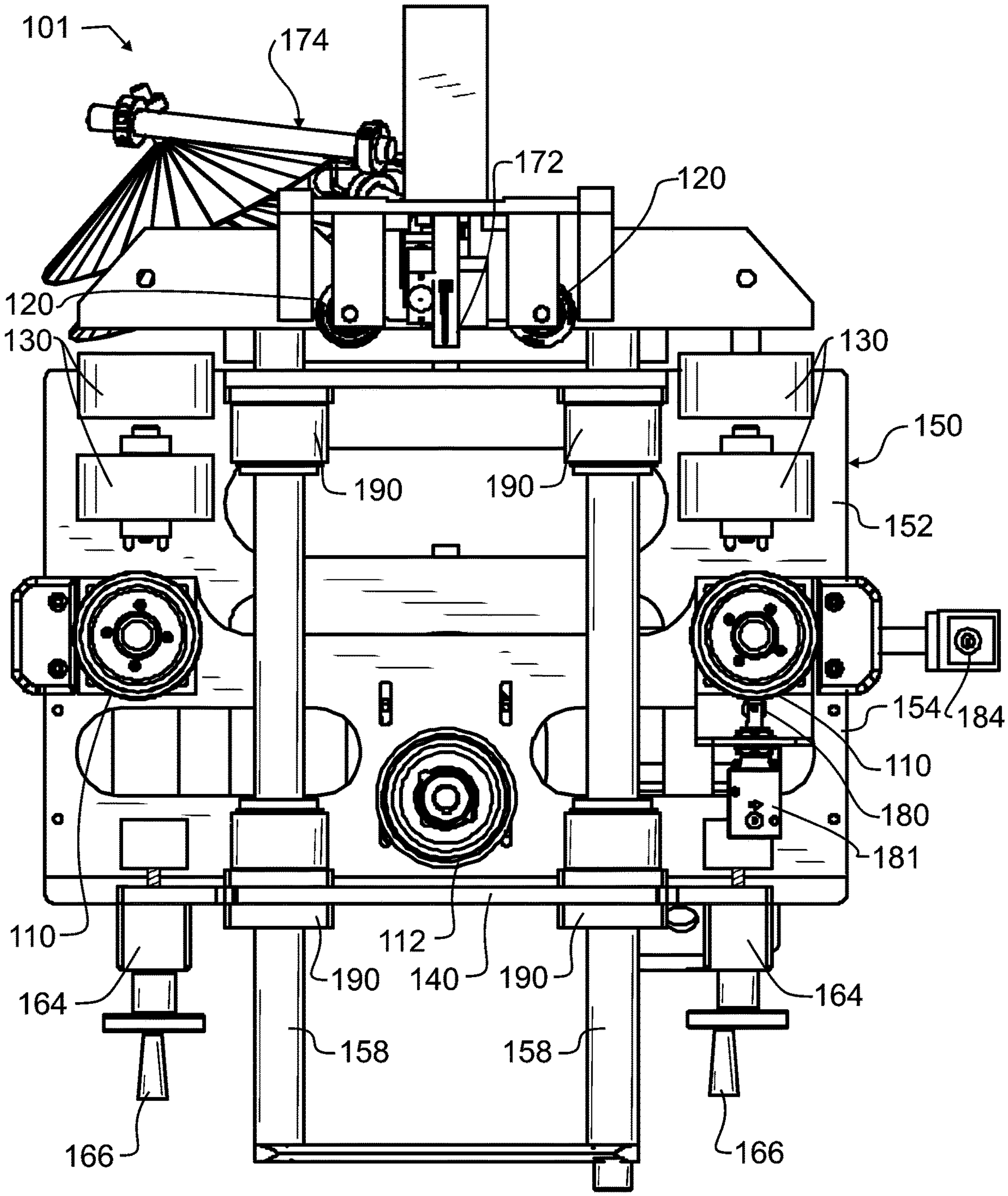
Figure 5:
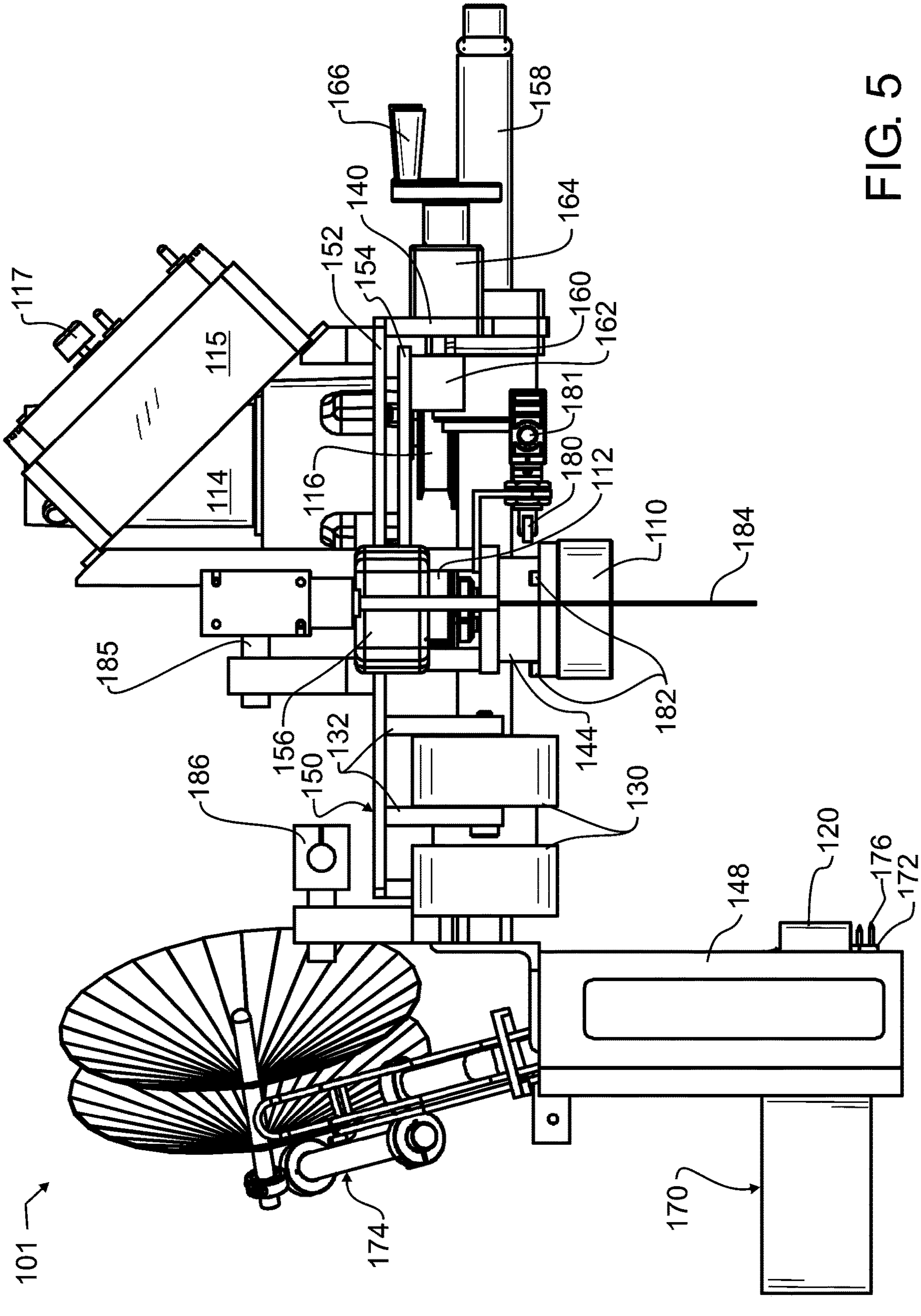
Figure 6:
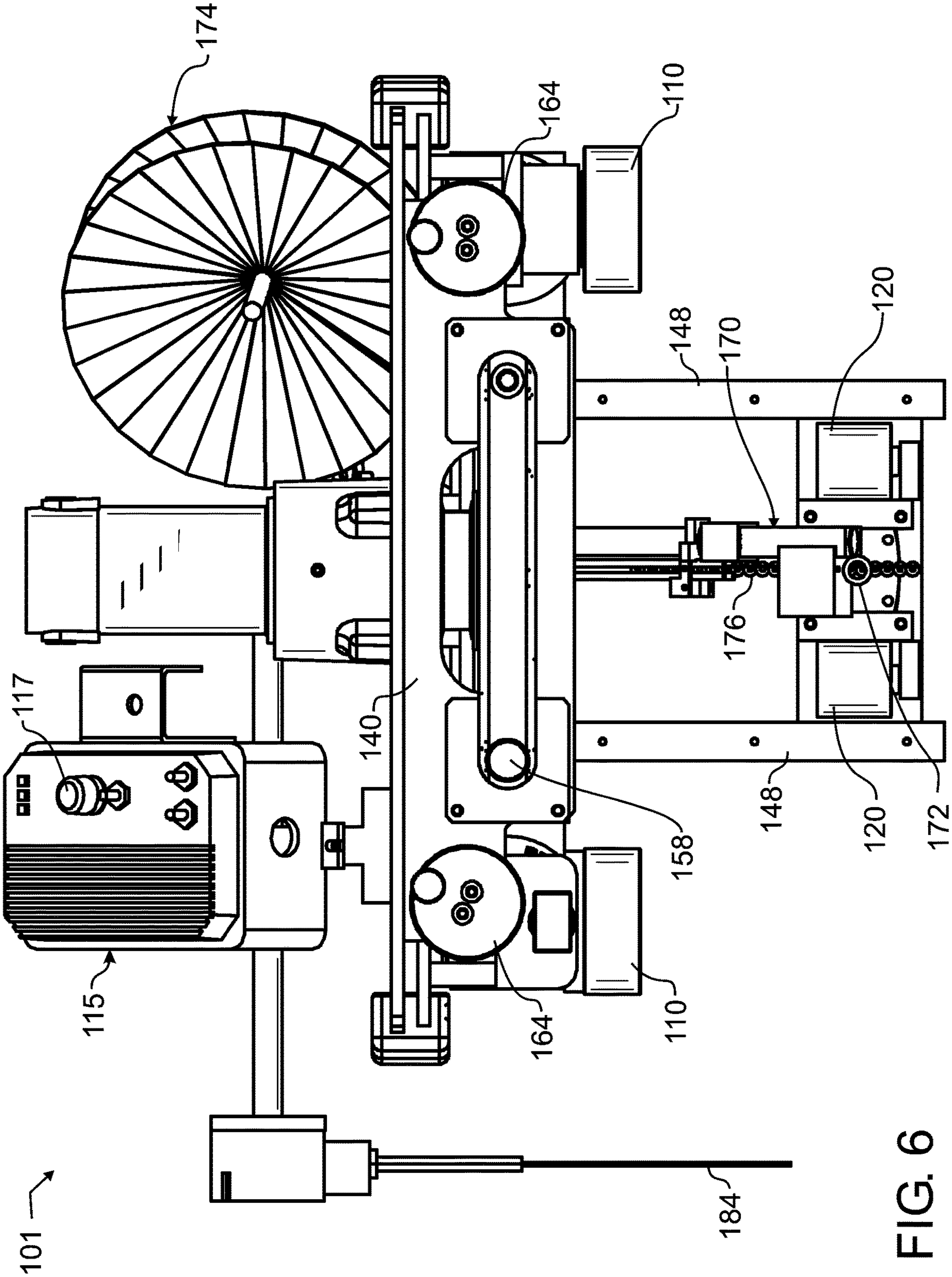

In a first preferred embodiment of the invention illustrated in FIGS. 1 and 2, coping nailer 1 is comprised of a set of wheels 10 that engage the interior vertical wall of the parapet, a set of wheels 20 that engage the exterior vertical wall of the parapet, a set of wheels 30 that engage the top horizontal wall of the parapet, a horizontal framework 50, and a nail gun 70.

Horizontal framework 50 spans the top of parapet 3 from beyond the outer edge and across the top of parapet 3 to extending beyond the interior of parapet 3, above the roof. Horizontal framework 50 provides a structural support for the remaining components of preferred embodiment coping nailer 1.

A set of wheels 30 support preferred embodiment coping nailer 1 on a top surface of parapet 3. Wheels 30 are preferably suspended beneath horizontal framework 50 by a set of vertical supports 32. Wheels 30 allow a person to set preferred embodiment coping nailer 1 directly onto the top of parapet 3, while ensuring that wheels 10 and 20 straddle parapet 3. Vertical supports 32 are preferably adjustable to allow preferred embodiment coping nailer 1 to be raised or lowered relative to parapet 3, but may in alternative embodiments be fixed.

Wheels 20 attach through vertical supports 42 to horizontal framework 50. Like vertical supports 32, vertical supports 42 are in some embodiments adjustable to allow wheels 20 to be raised or lowered as required for a particular parapet and coping combination.

In preferred embodiment coping nailer 1, a pair of moveable connectors 90 with adjustable locking handles adjustably connect horizontal bar 40 and vertical supports 46 to horizontal framework 50. A locking handle on movable connectors 90 may for exemplary and non-limiting purpose operate in the manner of the one-way clutch found on woodworking pipe clamps. This allows moveable connectors 90 to slide onto individual members within horizontal framework 50 easily in a direction toward parapet 3, while resisting movement away from parapet 3 unless the locking handle is released. A person may then push either horizontal bar 40, vertical supports 46, or moveable connectors 90 toward parapet 3 after placing preferred embodiment coping nailer 1 onto the top surface of parapet 3. This provides a secure hold to urge drive wheels 10 into secure engagement with parapet 3, while still accommodating a range of parapet widths.

Intermediary springs 60 accommodate smaller variations in geometry or width of parapet 3, while maintaining a relatively constant force between wheels 10 and 20 facing opposing sides of parapet 3. These forces generated by locking handle 90 in combination with intermediary springs 60 and any resilience within the framework and wheels 10, 20 must be greater than the force required to drive nailer nose 72 into coping strip 2 and thereby trigger nail gun 70 to fire a nail through coping 2.

Intermediary springs 60 are illustrated in FIGS. 1 and 2 as compression springs. Nevertheless, the type of springs 60 and couplings between wheels 10 and framework 50 is not critical to the present invention. In some alternative embodiments torsion arms, torsion springs, elastomeric springs, elastomeric wheels, and other types of spring or resilient members known in the mechanical arts and suitable for use with the present invention are used to accommodate the variations in width of the parapet.

In alternative embodiments, other suitable apparatus that permits the distance between wheels 10 and 20 to be adjusted may be used. Various apparatus for exemplary and non-limiting purpose will include various screw drives that drive or retract along an axis, pivots and levering handles that will cause vertical supports 42 or 46 to pivot wheels 10, 20 closer to parapet 3, and other suitable apparatus well known in the mechanical arts.

At least one of wheels 10, 20, 30 will preferably incorporate or be driven by a motor. In preferred embodiment coping nailer 1, there will also preferably be a suitable transmission and power control, each that may be manually or automatically controlled to move preferred embodiment coping nailer 1 linearly along the top of parapet 3. In an alternative embodiment, the motor may be an electric motor that directly drives a wheel, the speed which is controlled by suitable electronic motor controller. In a further alternative embodiment, a person may push preferred embodiment coping nailer 1 along parapet 3, but this is much less desirable, since the person may in the process also apply other forces that may interfere with proper operation.

While wheels 10, 20, 30 are used in first preferred embodiment coping nailer 1, those skilled in the mechanical arts will understand that a myriad of other apparatus exist to convey one object relative to another. In alternative embodiments, these other conveyance apparatus are used. For exemplary and non-limiting purpose, endless belts and tracks are well-known alternatives to wheels. Nevertheless, for their simplicity, low cost, and ready availability, wheels are preferred for many embodiments of the present invention.

As already noted above, the interaction of wheels 10, 20, and spring 60 cause preferred embodiment coping nailer 1 to track across various rough surfaces that are commonly found on a parapet 3 and ensure proper orientation of coping nailer 1. Coping nailer 1 pivotally and preferably through bias force or the force of gravity supports a nail gun 70 in a position tending toward coping 2. Nail gun 70 is held at a distance from coping edge strip 2 by one or more elliptical wheels 80, two being illustrated. When more than one elliptical wheel is used, it will be understood that some means of controlling the rotation of the plurality of wheels to ensure they stay synchronized is most preferred. This might, for exemplary and non-limiting purpose, comprise a sprocket rigidly affixed with each wheel, each sprocket of like diameter, and a chain that travels between the sprockets.

Due to the elliptical nature of wheels 80, as preferred embodiment coping nailer 1 moves along parapet 3, these wheels 80 will cyclically bring nailer nose 72 closer to and farther from coping strip 2. The elliptical wheel 80 are configured to bring nose 72 into contact with coping strip 2, causing nail gun 70 to fire two nails per rotation through coping strip 2 into parapet 3. The distance between nails can be determined using half the circumference of the elliptical wheel 80. The half circumference of elliptical wheel 80 can be any quantity, for exemplary purposes from one-half of an inch to twenty four inches, and more preferably between two and six inches. Nail gun 70 may also have a moveable connector similar to moveable connectors 90 or alternatives thereto connected to horizontal support 50 to aid in positioning of coping nailer 1 on parapet 3.

While the inclusion of elliptical wheels 80 allows movement of preferred embodiment coping nailer 1 to occur relatively independent of wheels 80, in an alternative embodiment wheels 80 are eliminated completely, and wheels 20 are replaced by elliptical wheels. This substitution will still cause nail gun 70 to be cyclically driven into coping strip 2, thereby causing nail gun 70 to fire nails therein.

While nail gun 70 is most preferred, in some alternative embodiments a screw gun or other fastening apparatus is substituted. In other alternative embodiments, a drill, hammer drill, or other apparatus that prepares a location for subsequent insertion of a fastener is substituted. Nevertheless, in such instances the alternative fastening apparatus must either be able to nearly instantaneously drive the fastener into place, the drive apparatus such as motor and drive wheel combination must be controlled to pause to allow time for the fastener to be properly anchored (such as to allow sufficient rotations of an automated screwing machine), or there must be provided means to allow the alternative fastening apparatus to stay in a position fixed relative to parapet 3 until the fastener is fully driven into place or the location fully prepared for subsequent fastener insertion, such as but not limited to a pivotal or elastic suspension incorporated into vertical supports 48 or a second drive system that displaces nail gun 70 in a reciprocating manner and timed to match the opposite displacement speed of driven wheels 10 to stay stationary in one reciprocating direction, and to then travel at twice the speed in the other direction. Vertical supports 48 are in preferred embodiment coping nailer 1 also height adjustable to allow nail gun 70 to be raised or lowered relative to horizontal framework 50, but in some alternative embodiments these supports will instead be fixed.

From the foregoing figures and description, several additional features and options become more apparent. First of all wheels 10, 20, and 30 may be manufactured from a variety of materials, including rubber, resins, and plastics, or even combinations or composites of the above. The specific material used may vary, though special benefits are attainable if several important factors are taken into consideration. First, wheels 10, 20, 30 and 80 need to be durable and provide traction and guidance for coping nailer 1. By using resilient materials, there is a dampening of energy when nailer 70 contacts coping strip 2 and fires a nail. Furthermore, it is preferable that all materials are sufficiently tough and durable to not fracture, or skip on the surface of parapet 3 or coping 2, even when great forces are applied thereto.

In preferred embodiment coping nailer 1, for exemplary and non-limiting purposes, horizontal support 50 and vertical supports 32, 42, 46, are fabricated from steel, which has the advantages of being quite durable, resistant to impacts, and rigid. The steel may be alloyed, such as stainless steel, to provide resistance to corrosion. In an alternative embodiment, the steel may be plated, coated, galvanized, or otherwise treated to improve appearance and corrosion resistance. In a further alternative embodiment, these components may be fabricated from aluminum, which has the advantages of being very corrosion resistant and extremely strong to withstand great force with less weight than required for the steel.

Two different embodiments of apparatus designed in accord with the present invention have been illustrated in the various figures. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

A second preferred embodiment of the invention is illustrated in FIGS. 3-6. This second preferred embodiment coping nailer 101 comprises a number of common features to coping nailer 1. A set of wheels 110 engage a first vertical wall of the parapet, while a second set of wheels 120 engage the opposite vertical wall of the parapet. The spacing between wheels 110, 120 is controlled through the reciprocal movement of subsidiary framework 154 relative to primary framework 152. To effect this movement, a relatively coarse adjustment of the spacing between wheels 110, 120 is accomplished by sliding horizontal bar 140 along tubes 158 either closer to wheels 120 or farther therefrom. Linear bearings 190 are provided to facilitate reciprocation along tubes 158. When the wheels are in appropriate position, a locking mechanism such as described herein above with respect to moveable connectors 90 or the like is used to prevent further movement of horizontal bar 140 along tubes 158.

Intermediary springs 160 are coupled with and provide resiliency between horizontal bar 140 and subsidiary framework 154. A spring base capture 162 is provided to anchor springs 160 to subsidiary framework 154. These springs 160 accommodate smaller variations in geometry or width of parapet 3, while maintaining a relatively constant force between wheels 110 and 120 facing opposing sides of parapet 3. Fine adjustment to the spring force generated by springs 160 is provided by at least one screw drive 164. As illustrated, each of the pair of screw drives 164 are manually adjusted by a crank handle 166 that will increase or decrease the spring force applied by the associated spring 160, such as by increasing or decreasing the compression upon the spring. While crank handles 166 are illustrated, in some alternative embodiments a motor or other source of motive power may be used to drive the pair of screw drives 164.

A pair of slides 156 on either side of subsidiary framework 154 and primary framework 152 keep the two frameworks properly spaced apart. Each slide 156 has a cross-section geometry of a capital “E”, allowing primary framework 152 to be inserted into the top portion of the slide, and subsidiary framework 154 to be inserted into the bottom portion. Four wheels 130 engage the top horizontal wall of the parapet, though any suitable number may be used.

Rather than trigger nail gun by movement closer to and farther from the parapet, in second preferred embodiment coping nailer 101 a nail gun 170 is controlled pneumatically. Pneumatic valve 181 is triggered by a wheel 180 that engages a plurality of posts 182 projecting from one of the two wheels 110. Two posts 182 are visible in FIG. 5, and are arranged above and in fixed rotation with wheel 110 at 120 degree spacings. Each time a post 182 engages with wheel 180, wheel 180 will be driven toward the body of pneumatic valve 181, thereby actuating the valve. While not illustrated to simplify the illustration, pneumatic valve 181 is connected appropriately with nail gun 170 such that when post 182 engages with wheel 180 and thereby actuates pneumatic valve 181, nail gun 170 will in turn fire a nail 176 from nailer nose 172. While a pneumatic nail gun 170 is used in second preferred embodiment coping nailer 101, it will be understood that nail gun 170 in some alternative embodiments is electrically or otherwise powered.

The circumference of wheel 110 and the number and angular spacing of posts 182 determine the spacing between adjacent nails. For exemplary and non-limiting purpose, with a twelve inch circumference wheel 110 and three posts 182 spaced evenly at 120 degree increments, a nail 176 will be fired with every four inches traversed. In one exemplary alternative embodiment having only two posts 182 provided at 180 degree increments, then a nail 176 is instead fired with every six inches traversed. In addition, in some embodiments a manual actuator is provided to trigger actuation of nail gun 170. For exemplary and non-limiting purpose, a momentary switch that is manually depressed to cause nail gun 170 to fire a nail from nailer nose 172 provides additional flexibility for a person operating second preferred embodiment coping nailer 101. In some alternative embodiments, a rotary encoder, alternative rotary position sensor, and other electrical position detection is provided instead of posts 182 to detect angular position of wheel 110, and such electrical position detection is used to trigger pneumatic valve 181 at appropriate wheel 110 positions. In yet other alternative embodiments, other types of position or displacement detection, including for exemplary and non-limiting purpose precision GPS, ultrasonic position detection, and laser range finding, are used instead of posts 182 to detect angular position of wheel 110, and such position detection is used to trigger pneumatic valve 181 at appropriate positions of second preferred embodiment coping nailer 101 along parapet 3. In some alternative embodiments, the positions of fasteners is programmed into second preferred embodiment coping nailer 101, and when such positions or displacements are detected by any suitable means, installation of a suitable fastener is initiated. In the event the fastener is a nail, this is accomplished through the triggering of nail gun 170. In alternative embodiments that use other fasteners, a suitable fastener installation tool such as a screw driver will be triggered. In those alternative embodiments where the fastener installation tool requires time or has other limitation that does not permit continuous displacement of second preferred embodiment coping nailer 101 along parapet 3, then movement of second preferred embodiment coping nailer 101 along parapet 3 will be temporarily halted as well, such as by temporarily stopping or slowing drive motor 114.

Nails 176 may be stored in a coiled strip or roll as is known in the fastener art, retained upon nail magazine 174 that supports the nail roll. When the supply of nails is depleted, such as illustrated in the Figures, a new coil of nails may be installed into nail magazine 174. In one alternative embodiment, a quick change nail magazine may be provided that permits detachment and replacement of the magazine of nails directly from nail gun 170. In another alternative embodiment, the nailer has a self-contained store of nails, and the entire nail gun 170 is coupled through a quickly detachable connector to permit replacement of the nail gun assembly when the supply of nails is low or exhausted.

While wheels 130 are fixed relative to horizontal framework 150, nail gun 170 or an alternative driver, drill, or tool is preferably coupled through vertical support 148 that may be adjustable either in increments as illustrated, or, if so provided in alternative embodiments, with a vertical screw drive or other equivalent or suitable adjustment means known by those reasonably skilled in the mechanical arts to allow nail gun 170 to be raised or lowered relative to horizontal framework 150 and thereby relative to parapet 3.

At least one of wheels 110, 120, 130 will preferably incorporate or be driven by a motor. In second preferred embodiment coping nailer 101, a drive motor 114 is provided which may optionally include a suitable transmission and electric or electronic motor controller 115, each that may be manually or automatically controlled to move preferred embodiment coping nailer 101 linearly along the top of parapet 3. Each wheel 110 is driven by a pulley 112, while drive motor 114 drives pulley 116. A suitable belt couples pulley 116 to each pulley 112.

In an alternative embodiment, the motor may be an electric motor that directly drives a wheel, the speed which is controlled by suitable electric or electronic motor controller 115. In a further alternative embodiment, a person may push second preferred embodiment coping nailer 101 along parapet 3, but this is much less desirable, since the person may in the process also apply other forces that may interfere with proper operation.

In other alternative embodiments, a plurality of nail guns 170 or alternative drivers, drills, or other tools are provided. In further alternative embodiments, the plurality of nail guns 170 or the like are displaced from each other and configured to fire in unison, thereby allowing a plurality of fasteners to be installed simultaneously. Since in some alternative embodiments the one or more nail guns 170 are replaced by other types of drivers and fasteners, for exemplary purposes such as by hammer drills that prepare for subsequent installation of screws and washers, first and second preferred embodiment coping nailers 1, 101 readily may be configured to install a wide variety of roofing components which will be apparent to those reasonably skilled in the art of commercial roofing and sheet metal. For exemplary and non-limiting purpose, a hammer drill that prepares for subsequently installed screws and washers may be used in the process of installing roof membrane anchors along the interior face of a parapet. In such cases, and as already discussed herein above, a drive motor such as drive motor 114 will need to be designed and controlled to provide adequate time at a fixed relative location for nail guns 170 or alternative apparatus such as hammer drills, rather than to be in continuous motion relative to parapet 3.

As illustrated, second preferred embodiment coping nailer 101 will only require a nominal electric or electronic motor controller 115 sufficient for a few tasks. In addition to the panel mounted emergency stop switch 117, preferred tasks for motor controller 115 are to stop nailer 101 once a set distance is covered, when the machine runs out of fasteners, when the machine is done drilling or otherwise installing fasteners, when the machine comes to a corner or step up or down on a wall, or when the machine comes up to an obstacle. Detection of traveling a set distance can be determined by monitoring the activation of pneumatic valve 181, or through any suitable equivalent or alternative, including for exemplary and non-limiting purpose other mechanical measuring device, vision systems, laser, LIDAR, ultrasonic, and GPS position detection. Detection of when the machine runs out of fasteners will preferably be provided by a nail detector, which might for exemplary and non-limiting purpose be a magnetic or optical detector. In some embodiments, the nail detector will be placed ahead of the nails 176 passing into nailer nose 172 by a particular number, allowing electric or electronic motor controller 115 an opportunity to warn the operator of the low status. When the remaining nails 176 or alternative fasteners have been installed, in some embodiments electric or electronic motor controller 115 will stop second preferred embodiment coping nailer 101, pending refill.

A whisker sensor 184 is illustrated in the Figures to detect when second preferred embodiment coping nailer 101 comes to a corner or step up or down on a wall, or an obstacle. As illustrated, whisker sensor 184 is secured into whisker support for exterior nailing 185. This position is used to detect an end-of-travel condition when nail gun 170 is working on a parapet exterior surface. In such case, whisker sensor 184 will come into contact with an interior corner in advance of any other part of nailer 101. However, and as aforementioned, second preferred embodiment coping nailer 101 may be reversed with regard to the parapet, meaning nail gun 170 will face the interior surface of the parapet. For whisker sensor 184 to be of benefit, it will be removed from whisker support for exterior nailing 185 and will next be inserted or installed into whisker support for interior nailing 186. This rearrangement provides two alternative positions for whisker support 184. Since whisker support 184 may also be rotated about a vertical axis through 180 degrees prior to insertion into either support 185 or support 186, there are in fact four different positions for whisker support 184, allowing accommodation for not only parapet interior and exterior wall surfaces, but also accommodating opposed directions of travel along the parapet top edge.

As may be appreciated, second preferred embodiment coping nailer 101 incorporates a relatively simple motor controller 115, since it is used only to control appropriate stopping, travel speed, and dwell time appropriate for particular driver and fastener. However, in some alternative embodiments, additional capabilities are provided that require much greater capability. For exemplary and non-limiting example, in some embodiments GPS or other suitable position system detection is provided. In a subset of such embodiments, the GPS system is further configured to communicate wirelessly with an operator-held device to reveal where coping nailer 101 is located when it stops and or needs assistance. In some alternative embodiments, location information will be uploaded to the cloud to be used as desired or required. In some alternative embodiments, obstacle avoidance systems will be used to stop second preferred embodiment coping nailer 101 for situations like but not limited to step up or down in walls, corners, and other possible obstacles. In some embodiments multiple detection systems are incorporated, for exemplary and non-limiting purpose including but not limited to mechanical, vision systems, laser, LIDAR, ultrasonic, and equivalent or comparable systems.

In some alternative embodiments, a communication system will be provided. Various types of communications, for exemplary and non-limiting purposes, will include Wi-Fi™, Bluetooth™, other radio, optical, inductive, and alternative communications. In these embodiments, communication is used for exemplary and non-limiting purpose to report past, current, and future work, status, self-diagnostics and error reporting, communicating with other types of equipment, uploading new programming, troubleshooting, and reporting to automated cloud-based systems as necessary or desired. In some embodiments position detection is integrated with communications, enabling remote validation of proper operation, and recording and archiving the locations of installed fasteners.

The communication system will in some embodiments further enable remote control or operation of coping nailer 101. In some of these embodiments, the remote control may be further augmented with Virtual Reality (VR) or Augmented Reality (AR) capabilities. One worker, or more commonly several workers, can manually place nailer onto parapet. However, in alternative embodiments where suitable cameras are provided to monitor coping nailer 101 remotely, a worker at ground level and/or in a climate-controlled space can operate and control the operations of coping nailer 101.

Figure 7:
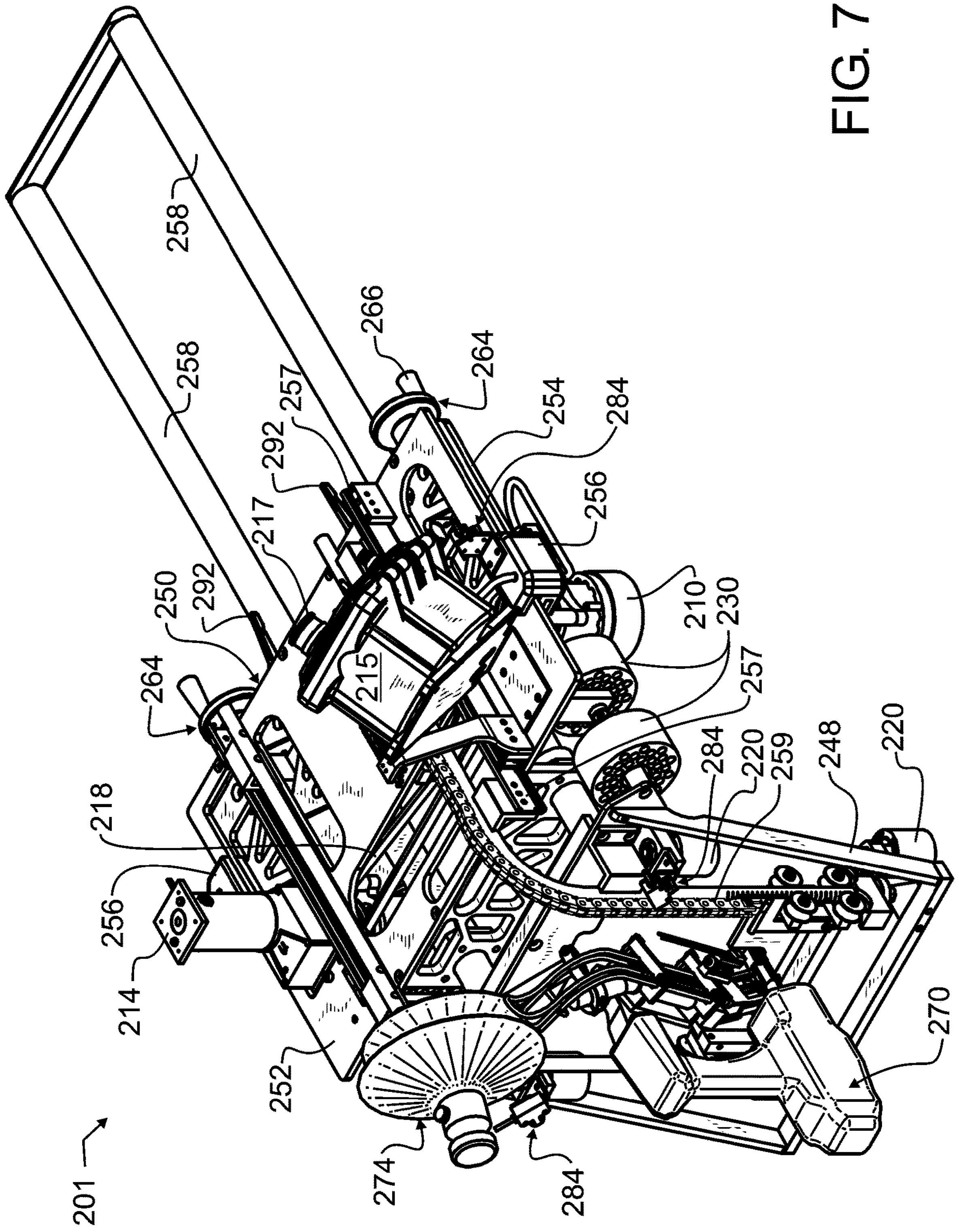
FIGS. 7-9 illustrate a third preferred embodiment coping nailer designed in accord with the teachings of the present invention from an isometric view, a front elevational view, and a bottom view, respectively.
Figure 8:
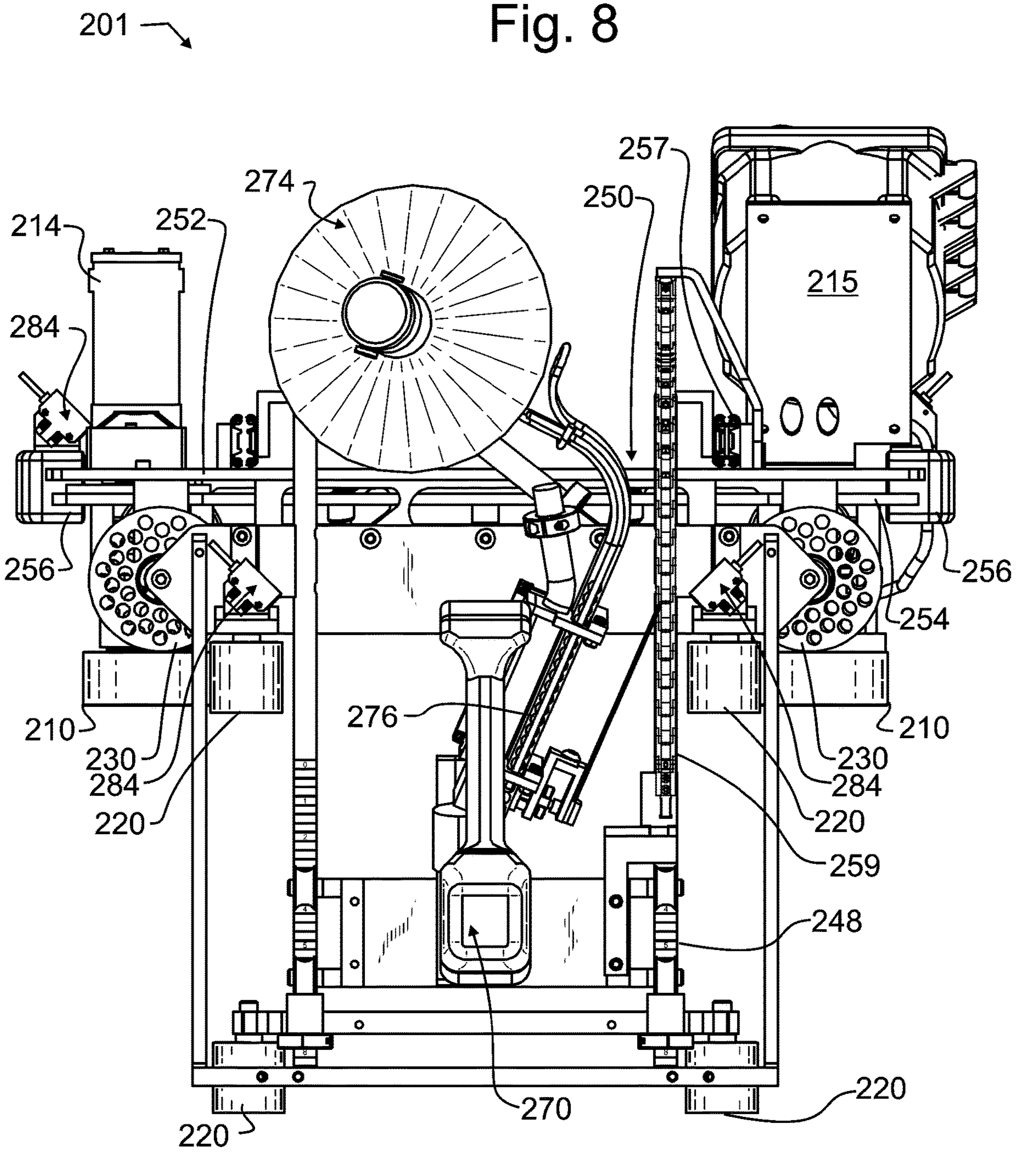
Figure 9:
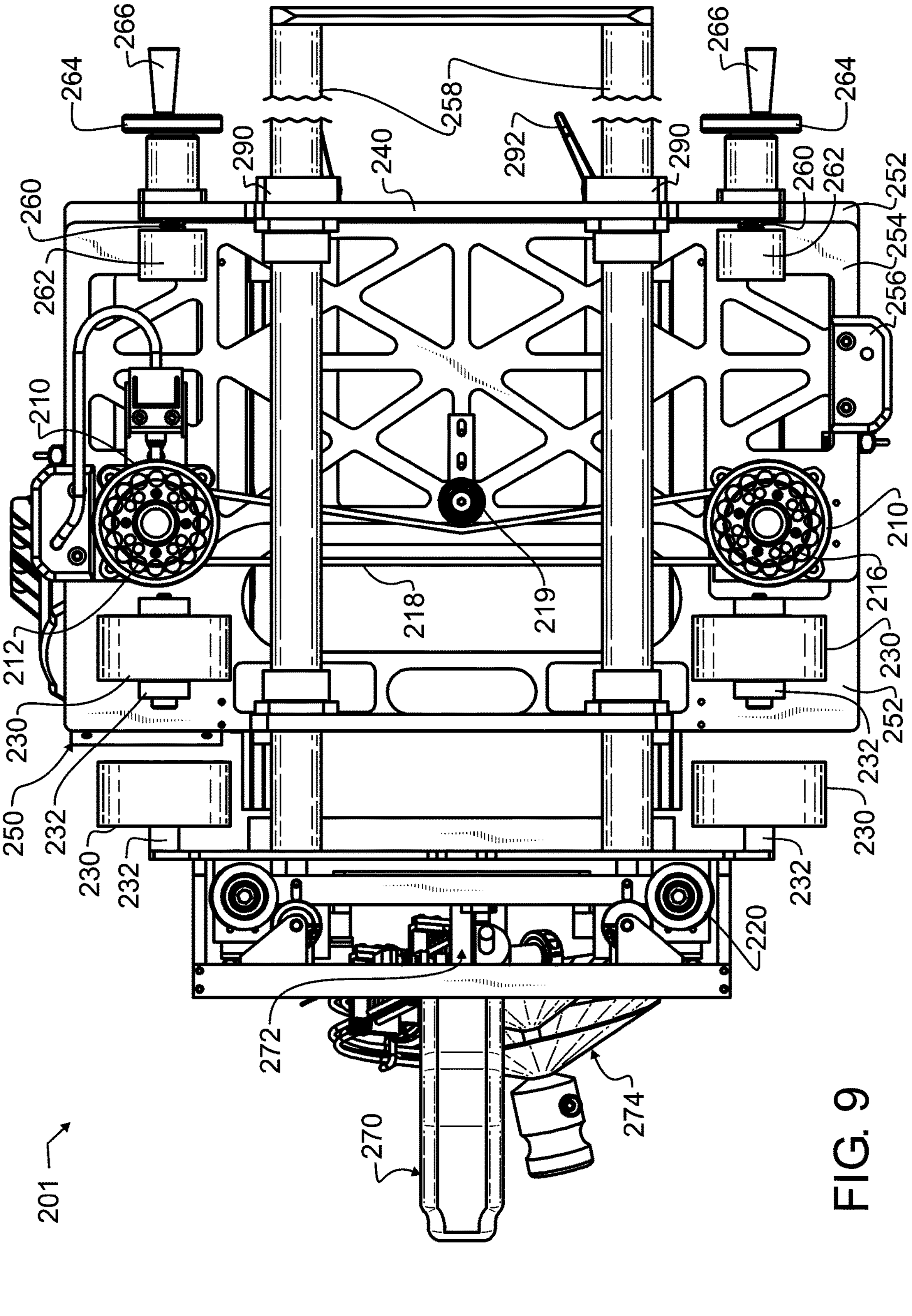

A preferred embodiment of the invention is illustrated in FIGS. 7-9. This third preferred embodiment coping nailer 201 comprises a number of features common with coping nailers 1 and 101, which, as noted herein above, will not be repeated. However, third preferred embodiment coping nailer 201 introduces several additional features, and variants of some of those found in the previous embodiments.

As best viewed in FIG. 7, as a replacement for whisker sensor 184 there are four laser range finders 284 that have been provided, one generally adjacent to each of the four different corners, and pointed and so measuring distances along the axis of travel along parapet 3. While laser range finders are illustrated in this third preferred embodiment and whisker sensors were illustrated in the second preferred embodiment, any suitable equivalent or alternative may be used in other embodiments, including for exemplary and non-limiting purpose other mechanical measuring device, vision systems, LIDAR, ultrasonic, and GPS position detection apparatus.

Also visible in FIGS. 7 and 8, cable carrier 259 is provided that provides protected flexible coupling of air lines and electrical wiring across the variable width gap between wheels 210 and wheels 220. For exemplary and non-limiting purpose but representative of this embodiment, these will include a pneumatic line to trigger firing of nail gun 270, and wiring between motor controller 215 and laser range finder 284. Supporting cable carrier 259 above primary framework 252 is a drawer slide 257 that allows cable carrier 259 to shift relative to primary framework 252 without dropping down and potentially into harmful interference with wheels 230 or parapet 3.

Visible in FIGS. 7 and 9 is drive belt 218 running between pulley 212 driven by drive motor 214, and pulley 216. Drive belt 218, as visible in FIG. 9, is tensioned by belt tensioner 219. Also visible therein is position clamp 292, which functions to lock horizontal bar 240 against relative movement with tubes 258.

While not visible in any of FIGS. 7-9, the third preferred embodiment coping nailer 201 still uses the same apparatus to determine firing timing as found in the second preferred embodiment, including a wheel 180, pneumatic valve 181, and posts 182 as described herein above.

In some alternative embodiments, communication with cell phones or other devices will be provided in some alternative embodiments. In such case, a remote kill switch feature will be preferred for many embodiments, allowing a machine operator to remotely instantly shut off or stop the operation of the coping nailer.

In some alternative embodiments, the communications system may comprise or include either or both of visual and audible communications. Such communications may be used for exemplary and non-limiting purpose to communicate information or alert people in the sight or sounding area.

The various sensors and control systems patents referenced herein above in the background section provide exemplary illustrations and teachings of various control and communications systems, the teachings which are understood to be incorporated herein by reference for inclusion in various embodiments of the present invention.

While not separately illustrated, in some alternative embodiments a tie-off anchor will be provided to allow a tie-off or similar safety cable to be affixed safely and securely to coping nailers designed in accord with the teachings of the present invention. Anchored safety cables are generally provided for the safety of workers, and such cables in some embodiments will also be used to anchor a coping member of the present invention.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. A coping nailer, comprising:

a conveyance configured to straddle and traverse a parapet, said conveyance having opposed parapet side wheels configured to traverse said parapet and thereby follow said parapet along opposed parapet vertical side walls;

a supply of plural fasteners;

a fastener driver configured when actuated to drive individual ones of said plural fasteners from said supply into said parapet; and an actuator configured to selectively and repeatedly actuate said fastener driver while said conveyance traverses said parapet.

2. The coping nailer of claim 1, wherein said actuator is configured to reciprocate said fastener driver closer to and farther from said parapet while said conveyance traverses said parapet.

3. The coping nailer of claim 2, wherein said actuator further comprises at least one elliptical wheel engaged with at least one of said parapet vertical side walls, said at least one elliptical wheel configured to define said reciprocation of said fastener driver relative to said parapet.

4. The coping nailer of claim 1, wherein said conveyance further comprises at least one parapet top wheel configured to traverse said parapet along a parapet top surface.

5. The coping nailer of claim 4, wherein said conveyance further comprises a primary generally horizontal framework and subsidiary generally horizontal framework parallel with and reciprocal relative to said primary framework along a generally horizontal framework reciprocation axis that is transverse to a longitudinal axis defined by said parapet top surface.

6. The coping nailer of claim 5, further comprising at least one linear bearing coupling said primary generally horizontal framework with said subsidiary generally horizontal framework and defining said generally horizontal framework reciprocation axis.

7. The coping nailer of claim 6, further comprising a screw drive configured to selectively reciprocate said generally horizontal framework relative to said subsidiary generally horizontal framework along said generally horizontal framework reciprocation axis.

8. The coping nailer of claim 7, further comprising a crank handle configured to actuate said screw drive.

9. The coping nailer of claim 8, further comprising a position clamp configured to selectively prevent said generally horizontal framework from reciprocating relative to said subsidiary generally horizontal framework along said generally horizontal framework reciprocation axis.

10. A method of applying fasteners into a parapet, comprising the steps of:

straddling said parapet with a conveyance having opposed parapet side conveyors configured to traverse said parapet along parapet vertical side walls, and a fastener tool supported by said conveyance;

pressing in a first direction at least a first one of said opposed parapet side conveyors against an exterior surface of said parapet;

pressing in a second direction opposite to said first direction at least a second one of said opposed parapet side conveyors against an interior surface of said parapet;

applying a drive force sufficient to move said opposed parapet side conveyors relative to said parapet and thereby cause said opposed parapet side conveyors to follow said parapet along opposed parapet vertical side walls and said conveyance to follow said parapet about a building perimeter;

actuating said fastener tool at discrete locations along said parapet; and driving individual ones of said fasteners into said parapet at individual ones of said discrete locations.

11. The method of applying fasteners into a parapet of claim 10, comprising the further step of changing an elevation of said opposed parapet side conveyors responsive to a change in an elevation of said parapet.

12. The method of applying fasteners into a parapet of claim 11, wherein said step of changing an elevation comprises the steps of:

pressing in a third direction perpendicular to said first and second directions an at least one parapet top conveyor against a top surface of said parapet; and traversing said parapet along said parapet top surface with said least one parapet top conveyor, said at least one parapet top conveyor coupled with said opposed parapet side conveyors.

13. The method of applying fasteners into a parapet of claim 10, comprising the further steps of:

ascertaining an actuation of an emergency stop switch;

measuring a traversal by said conveyance of a preset distance along said parapet;

detecting a lack of available individual ones of said fasteners;

completing a preset fastener installation sequence;

determining an arrival of said conveyance at a one of a parapet corner, parapet step up, or parapet step down;

identifying an obstacle encounter by said conveyance; and terminating said actuating step responsive to at least one of said ascertaining, measuring, detecting, completing, determining and identifying steps.

14. A coping nailer, comprising:

a conveyance configured to straddle and traverse a parapet, said conveyance having opposed parapet side wheels pressing against respective opposed parapet vertical side walls to thereby squeeze said parapet between said opposed parapet side wheels, said opposed parapet side wheels configured to traverse said parapet along said opposed parapet vertical side walls, and at least one parapet top wheel configured to press down upon and traverse said parapet along a parapet top surface;

a nail magazine supported by said conveyance and containing a plurality of nails;

a nail driver supported by said conveyance and configured when actuated to drive individual ones of said nails from said nail magazine into said parapet; and an actuator configured to selectively and repeatedly actuate said nail driver while said conveyance traverses said parapet.

15. The coping nailer of claim 14, wherein said actuator is configured to reciprocate said fastener driver closer to and farther from said parapet while said conveyance traverses said parapet.

16. The coping nailer of claim 15, wherein said actuator further comprises at least one elliptical wheel engaged with at least one of said parapet vertical side walls, said at least one elliptical wheel configured to define said reciprocation of said fastener driver relative to said parapet.

17. The coping nailer of claim 16, wherein said conveyance further comprises a primary generally horizontal framework and subsidiary generally horizontal framework parallel with and reciprocal relative to said primary framework along a generally horizontal framework reciprocation axis that is transverse to a longitudinal axis defined by said parapet top surface.

18. The coping nailer of claim 17, further comprising at least one linear bearing coupling said primary generally horizontal framework with said subsidiary generally horizontal framework and defining said generally horizontal framework reciprocation axis.

19. The coping nailer of claim 18, further comprising a screw drive configured to selectively reciprocate said generally horizontal framework relative to said subsidiary generally horizontal framework along said generally horizontal framework reciprocation axis.

20. The coping nailer of claim 18, further comprising a position clamp configured to selectively prevent said generally horizontal framework from reciprocating relative to said subsidiary generally horizontal framework along said generally horizontal framework reciprocation axis.

* * * * *